US010066197B2

(12) United States Patent
Hu et al.

(10) Patent No.: US 10,066,197 B2
(45) Date of Patent: Sep. 4, 2018

(54) COMPOSITION FOR FILTERING AND REMOVING PARTICLES AND/OR CONSTITUENTS FROM A FLUID

(71) Applicant: Imerys Filtration Minerals, Inc., San Jose, CA (US)

(72) Inventors: Qingchun Hu, Lompoc, CA (US); George A. Nyamekye, Santa Maria, CA (US); Robert H. Rees, Santa Maria, CA (US); Niels S. Mastrup, Santa Maria, CA (US); Larisa Tihomirov, Lompoc, CA (US); Walter N. Pavlakovich, Santa Maria, CA (US)

(73) Assignee: Imerys Filtration Minerals, Inc., San Jose, CA (US)

( * ) Notice: Subject to any disclaimer, the term of this patent is extended or adjusted under 35 U.S.C. 154(b) by 0 days.

(21) Appl. No.: 15/182,297

(22) Filed: Jun. 14, 2016

(65) Prior Publication Data

US 2016/0289618 A1 Oct. 6, 2016

Related U.S. Application Data

(60) Continuation of application No. 13/421,915, filed on Mar. 16, 2012, now abandoned, which is a division of application No. 12/373,753, filed as application No. PCT/US2007/073439 on Jul. 13, 2007, now abandoned.

(60) Provisional application No. 60/830,781, filed on Jul. 14, 2006, provisional application No. 60/945,954, filed on Jun. 25, 2007.

(51) Int. Cl.
| | |
|---|---|
| *C12H 1/07* | (2006.01) |
| *C02F 1/28* | (2006.01) |
| *B01D 37/02* | (2006.01) |
| *B01D 39/20* | (2006.01) |

(52) U.S. Cl.
CPC .......... *C12H 1/063* (2013.01); *B01D 37/025* (2013.01); *B01D 39/2068* (2013.01); *C02F 1/28* (2013.01); *B01D 2239/0478* (2013.01); *B01D 2239/1291* (2013.01); *C02F 1/281* (2013.01); *C02F 1/286* (2013.01); *C02F 1/288* (2013.01); *C02F 2209/11* (2013.01); *C02F 2303/20* (2013.01)

(58) Field of Classification Search
CPC ....................................................... C02F 1/281
See application file for complete search history.

(56) References Cited

U.S. PATENT DOCUMENTS

| | | | |
|---|---|---|---|
| 1,570,537 A | 1/1926 | Teitsworth | |
| 3,917,814 A | 11/1975 | Hedges et al. | |
| 4,072,537 A | 2/1978 | Kurrle | |
| 4,508,742 A | 4/1985 | McLaughlin et al. | |
| 4,511,473 A | 4/1985 | Hou | |
| 4,552,752 A | 11/1985 | Amick | |
| 4,596,660 A | 6/1986 | Hou | |
| 4,604,321 A | 8/1986 | Okahara et al. | |
| 4,606,824 A | 8/1986 | Chu et al. | |
| 4,636,494 A | 1/1987 | Growdon et al. | |
| 4,810,503 A | 3/1989 | Carson et al. | |
| 4,820,420 A | 4/1989 | Hums et al. | |
| 4,980,334 A | 12/1990 | Brennan | |
| 5,017,354 A | 5/1991 | Simms et al. | |
| 5,379,681 A | 1/1995 | Rollen | |
| 5,710,090 A | 1/1998 | Dufour | |
| 5,776,353 A * | 7/1998 | Palm | B01D 39/06 210/490 |
| 5,807,494 A | 9/1998 | Boes et al. | |
| 5,847,023 A | 12/1998 | Viegas et al. | |
| 6,214,383 B1 | 4/2001 | Esch et al. | |
| 6,712,898 B2 | 3/2004 | Palm et al. | |
| 6,712,974 B1 | 3/2004 | Palm et al. | |
| 2004/0055957 A1* | 3/2004 | Palm | B01D 39/06 210/660 |
| 2005/0026803 A1* | 2/2005 | Sivik | A62D 1/0071 510/357 |

FOREIGN PATENT DOCUMENTS

| | | |
|---|---|---|
| CN | 1098661 A | 2/1995 |
| CN | 1108149 A | 9/1995 |
| WO | WO 2005/117616 A2 | 12/2005 |
| WO | WO 2008/008940 A2 | 1/2008 |

OTHER PUBLICATIONS

European Search Report dated Aug. 5, 2010, in related European Application No. EP 07799552.0.
International Search Report and Written Opinion for International Application No. PCT/US2007/073439, dated Dec. 6, 2007.
Office Action for related Chinese Application No. 200780033488.6, dated Feb. 23, 2011.
Office Action for related EP Application No. EP 07799552.0, dated Jul. 25, 2011.

\* cited by examiner

*Primary Examiner* — Peter Keyworth
(74) *Attorney, Agent, or Firm* — Finnegan, Henderson, Farabow, Garrett & Dunner LLP

(57) ABSTRACT

Filter-aid materials are disclosed herein, and processes, systems, and methods using such filter-aid materials for filtering and removing particles and/or constituents from a fluid, wherein the filter-aid material comprises at least one filterable composite adsorbent comprising at least one adsorbent component formed in-situ on at least one filtration component. Further disclosed herein are filter-aid materials and processes, systems, and methods using such filter-aid materials for filtering and removing particles and/or constituents from a fluid, wherein the filter-aid material comprises at least one filterable composite adsorbent comprising at least one adsorbent component formed in-situ on at least one filtration component, and wherein the filter-aid material further comprises an at least one additional filtration component mixed with the at least one filterable composite adsorbent.

17 Claims, No Drawings

COMPOSITION FOR FILTERING AND REMOVING PARTICLES AND/OR CONSTITUENTS FROM A FLUID

RELATED APPLICATIONS

This application is a continuation of U.S. application Ser. No. 13/421,915, filed Mar. 16, 2012, which is a divisional of U.S. application Ser. No. 12/373,753, filed May 18, 2009, which is a National Stage Entry of PCT/US2007/073439, filed Jul. 13, 2007, which claims the priority of U.S. Provisional Application Nos. 60/830,781 filed Jul. 14, 2006, and 60/945,954 filed Jun. 25, 2007, all of the above applications are incorporated by reference herein in their entirety.

FIELD OF THE INVENTION

Disclosed herein are filter-aid materials and processes, systems, and methods using such filter-aid materials for filtering and removing particles and/or constituents from a fluid, wherein the filter-aid material comprises at least one filterable composite adsorbent comprising at least one adsorbent component formed in-situ on at least one filtration component. Also disclosed herein are filter-aid materials and processes, systems, and methods using such filter-aid materials for filtering and removing particles and/or constituents from a fluid, wherein the filter-aid material comprises at least one filterable composite adsorbent comprising at least one filtration component (such as a siliceous material) and at least one adsorbent component (such as a precipitated silica gel) having an average particle size of less than about 1 micron. Also disclosed herein are the filter-aid materials described above, wherein the filter-aid material further comprises at least one additional filtration component.

BACKGROUND OF THE INVENTION

In many filtration applications, a filtration device is comprised of both a filter element, such as a septum, and a filter-aid material. The filter element may be of any form such that it may support a filter-aid material, for example a cylindrical tube or wafer-like structure covered with a plastic or metal fabric of sufficiently fine weave. The filter element may be a porous structure with a filter element void to allow material of a certain size to pass through the filtration device. The filter-aid material may comprise one or more filtration components, which for example may be inorganic powders or organic fibrous materials. Such a filter-aid material may be used in combination with a filter element to enhance filtration performance. Often, filtration components for use in a filter-aid material are comprised of such materials as diatomite, perlite, and cellulose. As an example illustrative of the field of filtration, the filter-aid material may initially be applied to the septum in a process known as "pre-coating." Pre-coating generally involves mixing a scurry of water and filter-aid material and introducing the slurry in a stream flowing through the septum. During this process, a thin layer, such as about 1.5 mm to about 3.0 mm, of filter-aid material will eventually be deposited upon the septum, thus forming the filtration device.

During the filtration of a fluid, various insoluble particles in the fluid are trapped by the filter-aid material. The combined layers of filter-aid material and particles and/or constituents to be removed accumulate on the surface of the septum. Those combined layers are known as "filter cake."

As more and more particles and/or constituents are deposited on the filter cake, the filter cake may become saturated with debris to the point where fluid is no longer able to pass through the septum. To combat that problem, a process known as "body feeding" is often used. Body feeding is the process of introducing additional filter-aid material into the fluid to be filtered before the fluid reaches the filter cake. The filter-aid material will follow the path of the unfiltered fluid and will eventually reach the filter cake. Upon reaching the filter cake, the added filter-aid material will bind to the cake much the same way the filter-aid material bound to the septum during the pre-coating process. That additional layer of filter-aid material causes the filter cake to swell and thicken and increases the capacity of the cake to entrap additional debris.

As mentioned above, in the field of fluid filtration many methods of particle separation employ, for example, materials chosen from diatomite materials, expanded perlite, natural glasses, and cellulose materials as porous filtration components. Those materials have intricate and porous structures that may be particularly suited to the effective physical entrapment of particles in filtration processes. Those intricate and porous structures create networks of void spaces that may result in buoyant filtration media particles that have apparent densities similar to those of the fluids in which they are suspended. It is common practice to employ porous filtration components when improving the clarity of fluids. The porous filtration component is often used to remove undesired particles or constituents such as particulate matter from a fluid. However, while well suited for the task of removing particulate matter by physical entrapment, those porous filtration components may not be as well suited for the task of removing particulate matter from a fluid by the process of adsorption and are thus often times used in combination with an adsorbent component.

Diatomite, perlite, rice-hull ash, and cellulose are some examples of filtration component materials that may be used for particle separation. Diatomite, also known as diatomaceous earth, is a sediment enriched in biogenic silica in the form of siliceous skeleta of diatoms, a diverse array of microscopic, single-cell algae. Those frustules are sufficiently durable to retain much of their microscopic structure through long periods of geological time and through thermal processing. Diatomite products have an inherently intricate and porous structure composed primarily of silica. Perlite is a naturally occurring volcanic glass that may thermally expand upon processing. The structure of perlite may not be as intricate as diatomite and, consequently, perlite may be better suited for separating coarse micro-particulates from liquids having high solids loading. Finally, cellulose filtration component materials are generally produced by sulfite or sulfate processing of hardwoods and/or softwoods. Like perlite, cellulose filtration component materials may possess a less intricate structure than diatomite filtration component materials.

As used herein, "turbidity" is the cloudiness or haziness of a fluid, where the haze may be caused by individual particles that are suspended in the fluid. Materials that may cause a fluid to be turbid include, for example, clay, silt, organic matter, inorganic matter, and microscopic organisms. Turbidity may be measured by using an instrument known as a nephelometer that emits a beam of light through a column of the fluid being tested. A detector positioned on the same side of the fluid column measures the amount of light reflected by the fluid. A fluid that contains a relatively large number of suspended particles will reflect a greater amount GI light than a fluid containing fewer particles.

Turbidity measured in this fashion may be quantified in Nephelometric Turbidity Units ("NTU"). In addition, Turbidity may also be measured using gravimetric methods.

A trade-off typically exists in filter-aid technology between the permeability of the porous media used as a filtration component and its turbidity removal capabilities. Filtration components are produced in grades over a wide range of permeability ratings. As the permeability of the filtration component decreases, the ability of the filter-aid material to remove small particles may increase, but often at the expense of a slower flow rate through the filter-aid material. Conversely, as the filtration component permeability increases, the ability of the filter-aid material to filter particles may decrease and, consequently, the fluid flow through the filter-aid material increases. The extent to which this takes place will depend upon the type and particle size distribution of the suspended particles being removed from the fluid.

As used herein, "wet density" is an indicator of a material's porosity. For example, wet density reflects the void volume available to entrap particulate matter in a filtration process and, consequently, wet density may be used to determine filtration efficiency. Percent porosity may be expressed by the following formula:

Porosity=100*[1−(wet density/true density)]

Thus, filtration components with lower wet densities may result in products with greater porosity, and thus perhaps greater filtration efficiency, provided that the true density stays relatively constant. Typical wet densities for common filtration components may range from at least about 12 lb/ft$^3$ to about 30 lb/ft$^3$ or greater.

As used herein, "adsorption" is the tendency of molecules from an ambient fluid phase to adhere to the surface of a solid. This is not to be confused with the term "absorption," which results when molecules from an ambient fluid diffuse into a solid, as opposed to adhering to the surface of the solid.

To achieve a desired adsorptive capacity, and thus to be practical for commercial use, an adsorbent component may have a relatively large surface area, which may imply a highly porous structure with a small adsorbent component particle size. In certain embodiments, porous adsorbent components, in their un-reacted powder form, can have surface areas ranging up to several hundred m$^2$/g.

One technique for calculating specific surface area of physical adsorption molecules is the Brunauer, Emmett, and Teller ("BET") theory. The application of BET theory to a particular adsorbent component yields a measure of the materials specific surface area, known as "BET surface area." Generally speaking, BET surface areas of practical adsorbent components in their un-reacted powder form may range from about 300 to about 1200 m$^2$/g. As used herein, "surface area" refers to BET surface area.

One method of using an adsorbent component is to place the adsorbent component in contact with a fluid containing particles and/or constituents to be adsorbed, either to purify the fluid by removing the particles and/or constituents, or to isolate the particles and/or constituents so as to purify them. In certain embodiments, the adsorbent component containing the adsorbed particles or constituents is then separated from the fluid, for example by a conventional filtration process.

An illustrative example of an adsorption practice may be seen in the process of beer "chill-proofing." It is currently known that, unless specially treated, chilled beer may undergo a chemical reaction that results in the production of insoluble particles. In that chemical reaction, hydrogen bonds may form between haze-active proteins and/or polyphenols in a chilled condition. The reacted proteins and/or polyphenols may then grow to large particles, which causes the beer to become turbid, a condition also known as "chili-haze." Chill-haze may be undesirable to both consumers and brewers. Turbidity may be most pronounced when the beer has been chilled below room temperature. In certain instances, such as when the particles are proteins, as the temperature increases, the hydrogen bonds that hold the proteins together may be broken.

Chill-proofing may comprise a process that employs at least one adsorption component and/or at least one filtration component to remove particles creating chill-haze in the beer. One form of chill-proofing involves, in one step, adding solid adsorbent components, such as silica gel, to the beer prior to packaging. The particles and/or constituents bind to the added adsorbent components, and then, in a second step, the adsorbent components are subsequently filtered from the beer, which is then packaged for storage, sale, and/or consumption.

Filtration processes that implement both an adsorption step and a filtration step may be less efficient because of the difficulties of filtering the adsorbent components. For example, the adsorbent components may occupy void spaces of the porous filter-aid material. That occupancy may reduce the permeability of the filter-aid material, leading to an overall lower filtration flow rate.

There have been previous attempts to improve upon the traditional process of chill-proofing. Earlier attempts involved creating a simple mixture of an adsorbent component and a filtration component to combine the filtration and adsorption steps into one, thus eliminating the need to filter the adsorbent components. The term "simple mixture" is used herein to describe a composition comprising at least one adsorbent component and at least one filtration component where the two components are not chemically bonded, thermally sintered, or precipitated together. Simple mixtures may be somewhat ineffective as the components may be subject to separation due to physical distress often experienced in packaging and shipping. Therefore it would be desirable to combine the adsorption and filtration processes into one step and also ensure that the filtration components would not separate from the adsorbent components.

U.S. Pat. No. 6,712,974 to Palm et al. describes a filterable composite adsorbent comprising at least one adsorbent component that is thermally sintered and/or chemically bonded to at least one filtration component. The filterable composite adsorbent of Palm retains the properties of both its adsorbent and filtration components, and binds them in a fashion no as they do not segregated upon physical distress, providing a means for adsorbing particles and/or constituents while filtering the fluid in a single step. Although Palm discloses a filterable composite adsorbent, it does not disclose a filterable composite adsorbent where the adsorbent components have a smaller average particle size, such as 1 micron or smaller. Such a small particle size may be achieved by methods other than sintering or chemical bonding that are not contemplated or suggested by Palm, for example, by in-situ precipitation. Beneficially, a smaller adsorbent component particle size may lead to an increased surface area and, consequently, an increased efficiency at removing particles and/or constituents from a fluid.

SUMMARY OF THE INVENTION

The present invention overcomes the disadvantages of the prior art by providing an improved system and method for removing particles and/or constituents suspended in a fluid.

The filter-aid materials comprising at least one filterable composite adsorbent disclosed herein may be prepared in a manner that retains the properties of both the filtration and adsorbent components. To that end, a filter-aid material may be prepared that comprises at least one filterable composite adsorbent that may be prepared by in-situ precipitation of at least one adsorbent component on the surface of at least one filtration component. In certain embodiments, such in-situ precipitation may result in the adsorbent component being intimately associated with the at least one filtration component such that the components may be less susceptible to separation by physical distress than a simple mixture of those components.

In certain embodiments, an in-situ precipitation process may be used to create a filterable composite adsorbent having relatively small particle-sized adsorbent components, for example, less than 1 micrometer, on the surface of at least one filtration component. Consequently the filter-aid materials comprising at least one filterable composite adsorbent disclosed herein may provide a greater adsorptive surface area than prior implementations, thereby enabling the filter-aid materials to adsorb a greater amount of particles and/or constituents from a fluid than was previously possible. The adsorptive effectiveness of the filter-aid materials comprising at least one filterable composite adsorbent disclosed herein may be evidenced by a lower level of turbidity in the filtered fluid than could previously be achieved.

The filterable composite adsorbent of the present invention may be formed using an in-situ process that precipitates an adsorbent component with a much smaller particle size and, consequently, a much higher BET surface area than a thermally sintered or chemically bonded composite. The larger BET surface area may result in a filterable composite adsorbent with a greater adsorptive capacity, allowing more particles and/or constituents to be adsorbed by a filter-aid material comprising the filterable composite adsorbent. As a result of the increased BET surface area, the filter-aid materials comprising at least one filterable composite adsorbent disclosed herein may be more effective at removing particles and/or constituents from a fluid and may produce a fluid with a relatively low turbidity value.

In certain embodiments, the filter-aid materials comprising at least one filterable composite adsorbent disclosed herein may reduce the turbidity of the filtered fluid as compared with conventional techniques. In one embodiment, the turbidity of a fluid filtered through the filter-aid materials comprising at least one filterable composite adsorbent described herein is less than the turbidity of a fluid filtered through a simple mixture having the same proportion of adsorbent and filtration components as the filter-aid material comprising at least one filterable composite adsorbent. Further, the turbidity of a fluid filtered through the filter-aid materials comprising at least one filterable composite adsorbent may be less than the turbidity of a fluid filtered through a thermally sintered or chemically bonded mixture, having the same proportion of adsorbent and filtration components as the filter-aid material comprising at least one filterable composite adsorbent. In certain embodiments, the increased BET surface area of the filter-aid material comprising at least one filterable composite adsorbent as compared with known simple mixtures or thermally sintered or chemically bonded composites may allow for a greater adsorptive capacity, which may be due to the increased surface area on which particles and/or constituents may be adsorbed. While not wishing to be bound by theory, it is believed that since more particles and/or constituents can be adsorbed by the filter-aid material comprising at least one filterable composite adsorbent disclosed herein, fewer particles may remain in the filtered fluid, thereby reducing the turbidity of the filtered fluid.

In accordance with certain embodiments, the adsorbent component of the filter-aid material comprising at least one filterable composite adsorbent has an average particle size less than that of conventional filter-aid materials. In one embodiment, the at least one adsorbent component has a particle size of less than about 1 micrometer (micron). In another embodiment, the at least one adsorbent component has a particle size ranging from about 1 nanometer to about 100 nanometers. In a further embodiment, the at least one adsorbent component has a particle size ranging from about 1 nanometer to about 1 micron. Due its small average particle size, the at least one adsorbent component of the filter-aid materials comprising at least one filterable composite adsorbent disclosed herein may have a larger BET surface area than was previously possible. For instance, the at least one adsorbent component may have a surface area ranging from about 50 to about 510 $m^2/g$. Having a large adsorptive surface area may ensure that there are a relatively large number of sites where the particles and/or constituents to be removed can be adsorbed by the filter-aid materials comprising at least one filterable composite adsorbent.

Although many known adsorbents, in theft un-reacted, powder form, may have relatively large surface areas (e.g. ranging from about 300 to about 1200 $m^2/g$), such un-reacted powder adsorbents may tend to aggregate when they are bonded to a filtration component using conventional techniques, thus acting to lower the effective surface area. In contrast, the filter-aid material comprising at least one filterable composite adsorbent disclosed herein may be prepared using an in-situ process that prevents aggregation and enables the at least one adsorbent component to form with smaller average particle sizes than could previously be achieved. Consequently, the filterable composite adsorbent may support larger adsorptive surface areas which, in turn, provide for more effective adsorption properties.

The filter-aid materials comprising at least one filterable composite adsorbent disclosed herein may be produced with a wide range of permeabilities. In one embodiment, the filter-aid materials comprising at least one filterable composite adsorbent disclosed herein have a permeability ranging from about 0.001 to about 1000 Darcies ("Da"). In another embodiment, the permeability ranges from about 0.05 to about 10.00 Da. The range of permeability may allow for either a high flow rate or a lower flow rate. For instance, a lower flow rate may be about 1 $ml/min·cm^2$, while a high flow rate may be at least about 90 $ml/min·cm^2$. In one embodiment, the flow rate is about 1.2 $ml/min·cm^2$. In another embodiment, the flow rate is about 4 $ml/min·cm^2$. In a further embodiment, the flow rate ranges from about 1.2 to about 4 $ml/min·cm^2$. Flow rate has a generally measurable pressure which varies with the flow rate. In one embodiment, the pressure is about 1.2 psi. In another embodiment, the pressure is about 15 psi. In a further embodiment, the pressure ranges from about 1.2 to about 15 psi. In yet another embodiment, the flow rate is from about 1.2 to about 4 $ml/min·cm^2$ and the pressure is from about 1.2 to about 15 psi.

The filter-aid materials comprising at least one filterable composite adsorbent disclosed herein also may exhibit various wet densities. For example, the filter-aid material comprising at least one filterable composite adsorbent may have a wet density ranging from about 10 to about 25 $lb/ft^3$. As wet density reflects the void volume of the adsorbent component to entertain matter in the filtration process, a lower wet density may indicate that the adsorbent component has a high void volume and thus can adsorb more particles and/or constituents in the fluid.

In certain embodiments, the at least one adsorbent component of the filterable composite adsorbent may be a silica gel and the at least one filtration component may be chosen from natural glasses, such as expanded perlite, and biogenic silicas, such as diatomite. In one embodiment, the at least one adsorbent component is a silica gel and the at least one filtration component is diatomite. In another embodiment, the at least one adsorbent component is a silica gel and the at least one filtration component is perlite. Of course, those skilled in the art will understand that other adsorbent and filtration components may be employed. For example, in a further embodiment, the at least one filtration component May be chosen from biogenic silicas (such as rice hull ash and sponge spicules); natural glasses (such as pumice, expanded pumice, pumicite, expanded obsidian, and expanded volcanic ash); buoyant glasses; buoyant polymers; and celluloses.

In some embodiments, the filter-aid material comprises at least one additional filtration component mixed with the at least one filterable composite adsorbent. The at least one filtration component of the filterable composite adsorbent and the at least one additional filtration component of the filter-aid material may be the same or different. In one embodiment, the at least one additional filtration component may be chosen from biogenic silicas (including, but not limited to, rice hull ash and sponge spicules); natural glasses (including, but not limited to, pumice, expanded pumice, pumicite, expanded obsidian, and expanded volcanic ash); buoyant glasses; buoyant polymers; and celluloses. In another embodiment, the at least one additional filtration component is diatomite. In a further embodiment, the at least one additional filtration component is perlite.

The filter-aid materials comprising at least one filterable composite adsorbent disclosed herein May be made in various forms. For example, in one embodiment, the filter-aid materials comprising at least one filterable composite adsorbent are in the form of a powder. In another embodiment, the filter-aid materials may be in a form chosen from sheets, pads, and cartridges. In a further embodiment, the filter-aid materials are formed in-situ in the form chosen from rigid shapes, including but not limited to disks, cylinders, plates and polyhedrons. In yet another embodiment, the filter-aid materials may be in a form chosen from monolithic supports and aggregate supports. In yet a further embodiment, the filter-aid materials are a form chosen from monolithic substrates and aggregate substrates. In still yet another embodiment, the filter-aid materials are pulverized.

Various methods for making the filter-aid materials comprising at least one filterable composite adsorbent disclosed herein are contemplated. For instance, in one embodiment, sodium silicate may be mixed in an aqueous solution with an acid, such as sulfuric acid, until the solution pH is sufficiently low enough to support silica gel precipitation in the presence of at least one porous filtration component. At least one filtration component is then added to the solution and stirred until the silica precipitate begins to gel. The addition of the acid causes the at least one adsorbent component, silica gel in this illustrative embodiment, to precipitate onto the surface of the at least one filtration component, thus forming the filterable composite adsorbent.

In another embodiment, the filterable composite adsorbent may further be mixed with at least one additional filtration component to form a final filter-aid material product. In one embodiment, the at least one filtration component of the filterable composite adsorbent and the at least one additional filtration component of the filter-aid material are the same. In another embodiment, the at least one filtration component of the filterable composite adsorbent and the at least one additional filtration component of the filter-aid material are different. Those skilled in the art will appreciate that other methods alternatively may be used to synthesize the filterable composite adsorbent in accordance with the present disclosure.

One embodiment disclosed herein is a process for removing particles and/or constituents from a fluid comprising (i) providing at least one filter-aid material comprising at least one filterable composite adsorbent, (ii) pre-coating at least one filter element with the at least one filter-aid material comprising at least one filterable composite adsorbent, (iii) suspending the at least one coated filter element in a fluid containing the particles and/or constituents to be adsorbed.

Another embodiment is a method of adsorbing and filtering particles and/or constituents from a fluid that comprises passing a fluid containing particles and/or constituents to be adsorbed through a filter-aid materials comprising at least one filterable composite adsorbent, as disclosed herein, that is supported on a septum.

In an alternative embodiment, the method of adsorbing and filtering comprises passing a fluid containing particles and/or constituents to be adsorbed through a filter-aid materials comprising at least one filterable composite adsorbent, in the form of a rigid shape, as described above, supported on a septum.

DETAILED DESCRIPTION OF THE INVENTION

A. Filterable Composite Adsorbent

The filter-aid materials disclosed herein comprise at least one filterable composite adsorbent comprising at least one adsorbent component, and at least one filtration component having pores through which a fluid can pass, wherein the at least one adsorbent component has been precipitated in-situ on the surface of the at least one filtration component. A filter element may be used to support the filter-aid material comprising at least one filterable composite adsorbent. In one embodiment, filter element contains filter element voids through which fluid may flow. The filter-aid materials comprising at least one filterable composite adsorbent may retain both the adsorptive properties of the at least one adsorbent component and the porous structure of the at least one filtration component, thus enhancing the utility of the filter-aid materials comprising at least one filterable composite adsorbent.

Unlike simple mixtures in which adsorbent and filtration components may be mixed or blended together, the at least one adsorbent component is precipitated in-situ onto the surface of the at least one filtration component. As a result, while simple mixtures may segregate upon suspension (e.g., in fluid, conveyance, or transport), the filter-aid material comprising at least one filterable composite adsorbent of the present invention may retain both its component adsorptive and filtration properties. The in-situ precipitation of the at least one adsorbent component on the at least one filtration component may also have superior absorptive and filtration properties than a thermally sintered or chemically bonded composite, because the in-situ precipitation process may produce a filter-aid material comprising at least one filterable composite adsorbent with smaller particle-sized adsorbent components and, consequently, a larger surface area for adsorption. The larger surface area may allow the filter-aid material comprising at least one filterable composite adsorbent to adsorb a greater number of particles and/or constituents which, in turn, may result in a lower turbidity level for the filtered fluid.

The average particle size of the at least one adsorbent component that forms upon the surface of the at least one filtration component may be less than about 1 micrometer. In one embodiment, the average particle size is less than about 0.5 microns. In another embodiment, the average particle size is less than about 0.2 microns. In a further embodiment, the average particle size is less than about 0.1 microns. In yet another embodiment, the average particle size is less than about 50 nanometers. In yet a further embodiment, the average particle size is less than about 30 nanometers. In still another embodiment, the average particle size is less than about 20 nanometers. In still a further embodiment, the average particle size is less than about 10 nanometers. In another embodiment, the average particle size ranges from about 5 to about 50 nanometers. In a further embodiment, the average particle size ranges from about 2 to about 100 nanometers. In yet another embodiment, the average particle size ranges from about 5 nanometers to about 1 micrometer.

In certain embodiments, the BET surface area of the at least one adsorbent component may increase as the mean diameter of the at least one adsorbent component decreases. In one embodiment, the BET surface area of the at least one adsorbent component formed upon the surface of the at least one filtration component is greater than about 2 $m^2/g$. In another embodiment, the BET surface area is greater than about 5 $m^2/g$. In a further embodiment, the BET surface area is greater than about 10 $m^2/g$. In yet another embodiment, the BET surface area is greater than about 25 $m^2/g$. In yet a further embodiment, the BET surface area is greater than about 50 m2/g. In still another embodiment, the BET surface area is greater than about 85 $m^2/g$. In still a further embodiment, the BET surface area is greater than about 125 $m^2/g$. In another embodiment, the BET surface area is greater than about 250 $m^2/g$. In a further embodiment, the BET surface area ranges from about 2 $m^2/g$ to about 2550 $m^2/g$. In yet another embodiment, the BET surface area ranges from about 50 $m^2/g$ to about 510 $m^2/g$.

The larger BET surface area of the at least one adsorbent component may allow the filter-aid materials comprising at least one filterable composite adsorbent to reduce the number of particles and/or constituents that contribute to turbidity of the fluid. The filter-aid materials comprising at least one filterable composite adsorbent may entrap particles and/or constituents from the unfiltered fluid, resulting in the filtered fluid having fewer particles and/or constituents. Further, the turbidity of a fluid filtered through the filter-aid materials comprising at least one filterable composite adsorbent disclosed herein may be less than the turbidity of a fluid filtered through a simple mixture of at least one adsorbent component and at least filtration component, where the proportion of adsorbent component to filtration component in the simple mixture is similar to, or even greater than, the proportion of adsorbent component to filtration component of the filter-aid materials comprising at least one filterable composite adsorbent disclosed herein. Further, the turbidity of a fluid filtered through the filter-aid materials comprising at least one filterable composite adsorbent disclosed herein may be less than the turbidity of a fluid filtered through a thermally sintered or chemically bonded composite of an adsorbent component and a filtration component, where the proportion of adsorbent component to filtration component in the thermally sintered chemically bonded composite is similar to, or even greater than, the proportion of adsorbent component to filtration component of the filter-aid materials comprising at least one filterable composite adsorbent disclosed herein.

The filter-aid materials comprising at least one filterable composite adsorbent disclosed herein may be processed to provide a wide range of flow rates, which are directly related to permeability. Permeability may be reported in units of darcies ("Da"). One darcy corresponds to the permeability through a filter medium 1 cm thick which allows 1 $cm^2$ of fluid with a viscosity of 1 centipoise to pass through an area of 1 $cm^2$ in 1 second under a pressure differential of 1 atm (i.e., 101.325 kPa). Permeability may be determined using a device designed to form a filter cake on a septum from a suspension of filter-aid material in water and then measuring the time required for a specified volume of water to flow through a measured thickness of filter cake of known cross-sectional area. Many filtration media suitable for micro filtration, such as diatomite and perlite products, are commercially available and span a wide range of permeability, ranging from about 0.001 Da to over 30 Da, such as from about 0.05 Da to over 10 Da. Filter-aid material for coarse filtration, such as sand, may have greater permeabilities, such as at least about 1000 Da.

The selection of filtration permeability for a specific filtration process depends in part on the flow rate and degree of fluid clarification required for the particular application. In many cases, the flow of fluid through a filter-aid material may be closely related to the nature of the filtration component's porosity. Within a given family of filtration components, those of low permeability may have smaller pores capable of providing greater clarity because smaller particles can be retained during the filtration process, whereas those of high permeability may have larger pores capable of providing greater fluid flow, but usually at the expense of the ability to remove particles as small as those removed by their low permeability counterparts.

The adsorbent component may be selected from any suitable adsorbent known to the skilled artisan or hereafter discovered. In certain embodiments, the adsorbent may be a form of silica. In one embodiment, the at least one adsorbent component may be chosen from silica gels. Silica gels are a form of silicon dioxide ($SiO_2$), which may occur in nature as sand. In general, however, sand is crystalline and non-porous while silica gels are non-crystalline and porous. In another embodiment, the at least one adsorbent component may be a colloidal silica. In a further embodiment, the at least one adsorbent component may be a fumed silica. In yet another embodiment, the at least one adsorbent component may be a silica fume. In yet a further embodiment, the at least one adsorbent component is chosen from silicates. Non-limiting examples of suitable silicates include alumina silicate, calcium silicate, and magnesium silicate. In still another embodiment, the at least one adsorbent component is chosen from an alumina. In one embodiment, the alumina adsorbent component is an alumina silicate. In another embodiment, the alumina adsorbent component is a porous alumina.

The silica adsorbent may, in some embodiments, further be chosen from amorphous or crystalline silicas. In one embodiment, the silica adsorbent is an amorphous silica. In another embodiment, the silica is a crystalline silica.

Filtration components suitable for use in preparation of the filter-aid materials comprising at least one filterable composite adsorbent disclosed herein may possess a variety of pore sizes. In one embodiment, the filtration component pore size is a relatively large pore size, for example, a mean pore diameter of about 10 microns, such that it is particularly well suited for particle entrapment, thereby permitting mechanical filtration and/or clarification by means of removal of particles and/or constituents. In another embodiment, the filtration component pore size is a relatively small pore size, for example, a mean pore diameter of about 2 microns.

Filtration components suitable for use in the preparation of the filterable composite adsorbent disclosed herein may possess a variety of surface areas. In one embodiment, the filtration component may have a relatively large surface area. In another embodiment, the filtration component may have a relatively small surface area. Without wishing to be bound by theory, it is believed that a filtration component with a large surface area may allow for a reduction in the thickness of an adsorbent component coating which may be formed thereon, for example, a precipitated silica gel. The reduced thickness of the adsorbent coating is believed to provide for more sites for adsorption of the particles and/or constituents to be removed. In one embodiment, the surface area of the filtration component is at least about 1 $m^2/g$. In another embodiment, the surface area is at least about 3 $m^2/g$. In a further embodiment, the surface area is at least about 15 $m^2/g$. In yet another embodiment, the surface area is at least about 30 $m^2/g$. In yet a further embodiment, the surface area is at least about 50 $m^2/g$. In still another embodiment, the surface area ranges from about 1 $m^2/g$ to about 100 $m^2/g$. In still yet another embodiment, the surface area is less than about 500 $m^2/g$.

In one embodiment, the at least one filtration component and/or the at least one additional filtration component diatomite (a biogenic silica). In another embodiment, the at least one filtration component and/or the at least one additional filtration component is perlite (a natural glass). In another embodiment, the filtration components are chosen from biogenic silica, including but not limited to diatomite, rice hull ash, and sponge spicules. In a further embodiment, the filtration components are chosen from buoyant glasses. One example of buoyant glasses are natural glasses, including but not limited to pumice, expanded pumice, pumicite, expanded obsidian, expanded volcanic ash, and sand. In yet another embodiment, the filtration components are chosen from synthetic glasses. Examples of synthetic glasses include but are not limited to fiber glass, controlled pore glass, and foamed glass. In yet a further embodiment, the filtration components are chosen from buoyant polymers. Buoyant polymers include but are not limited to fibrous polymers (such as fibrous nylon and fibrous polyester) and powdered polymers (such as polyvinylchloride-acrylic copolymer powder). In still another embodiment, the filtration components are chosen from cellulose. In still a further embodiment, the filtration components are chosen from silicates. Non-limiting examples of suitable silicates include alumina silicate, calcium silicate, and magnesium silicate. In still yet another embodiment, the filtration components are chosen from an alumina. In one embodiment, the alumina filtration component is an alumina silicate. In another embodiment, the alumina filtration component is a porous alumina.

In one embodiment, the at least one filtration component and/or the at least one additional filtration component may comprise a mixture of two or more of the filtration components mentioned above. For example, in one embodiment, the at least one filtration component and/or the at east one additional filtration component may comprise a mixture of diatomite and perlite. The at least one filtration component and the at least one additional filtration component (if used) may be the same or different. In one embodiment, the filtration components are the same. In another embodiment, the filtration components are different.

The term "biogenic silica" as used herein refers to silica produced or brought about by living organisms. One example of biogenic silica is diatomite, obtained from diatomaceous earth (also known as kieselguhr), which is a sediment enriched in biogenic silica in the form of the siliceous frustules (i.e., shells or skeletons) of diatoms. Diatoms are a diverse array of microscopic, single-celled algae of the class *Bacillariophyceae*, which possess an ornate siliceous skeleton (frustule) of varied and intricate structure comprising two valves which, in the living diatom, fit together much like a pill box. The morphology of the frustules may vary widely among species and serves as the basis for taxonomic classification; over at least 2,000 distinct species are known. The surface of each valve is punctuated by a series of openings that comprise the complex fine structure of the frustule and impart a design that is distinctive to individual species. The size of typical frustules may range from about 0.75 μm to about 1,000 μm. In one embodiment, the size ranges from about 10 μm to about 150 μm. Those frustules are sufficiently durable to retain much of their porous and intricate structure virtually intact through long periods of geologic time when preserved in conditions that maintain chemical equilibrium. Other sources of biogenic silica are known, as many plants, animals, and microorganisms provide concentrated sources of silica with unique characteristics. For example, rice hulls contain sufficient silica that they are commercially ashed for their siliceous residue, a product known familiarly as "rice hull ash." Certain sponges are also concentrated sources of silica, the remnants usually occurring in geologic deposits as acicular spicules.

The term "natural glass" as used herein refers to natural glasses, commonly referred to as volcanic glasses, that are formed by the rapid cooling of siliceous magma or lava. Several types of natural glasses are known, including, for example, perlite, pumice, pumicite, obsidian, and pitchstone. Prior to processing, perlite may be gray to green in color with abundant spherical cracks that cause it to break into small pearl-like masses. Pumice is a lightweight gassy vesicular rock. Obsidian may be dark in color with a vitreous luster and a characteristic conchoidal fracture. Pitchstone has a waxy resinous luster and may be brown, green, or gray. Volcanic glasses such as perlite and pumice occur in massive deposits and find wide commercial use. Volcanic ash, often referred to as tuff when in consolidated form, comprises small particles or fragments that may be in glassy form. As used herein, the term natural glass encompasses volcanic ash.

Natural glasses may be chemically equivalent to rhyolite. Natural glasses that are chemically equivalent to trachyte, dacite, andesite, latite, and basalt are known but may be less common. The term obsidian is generally applied to large numbers of natural glasses that are rich in silica. Obsidian glasses may be classified into subcategories according to their silica content, with rhyolitic obsidians (containing typically about 73% $SiO_2$ by weight) as the most common.

Partite is a hydrated natural glass that may contain, for example, about 72 to about 75% $SiO_2$, about 12 to about 14% $Al_2O_3$, about 0.5 to about 2% $Fe_2O_3$, about 3 to about 5% $Na_2O$, about 4 to about 5% $K_2O$, about 0.4 to about 1.5% CaO (by weight), and small amounts of other metallic elements. Perlite may be distinguished from other natural glasses by a higher content (such as about 2 to about 5% by weight) of chemically bonded water, the presence of a vitreous, pearly luster, and characteristic concentric or arcuate onion skin like (i.e., perlitic) fractures.

Perlite products may be prepared by milling and thermal expansion, and may possess unique physical properties such as high porosity, low bulk density, and chemical inertness.

Pumice is a natural glass characterized by a mesoporous structure (e.g., having pores or vesicles with a size up to about 1 mm). The porous nature of pumice gives it a very low apparent density, in many cases allowing it to float on the surface of water. Most commercial pumice contains from about 60% to about 70% $SiO_2$ by weight. Pumice may be processed by milling and classification, and products may be used as lightweight aggregates and also as abrasives, adsorbents, and fillers. Unexpanded pumice and thermally expanded pumice may also be used as filtration components in some cases as can volcanic ash.

The appropriate selection of the at least one adsorbent component and the at least one filtration component of the filter-aid materials comprising at least one filterable composite adsorbent, as well as any at least one additional filtration component, disclosed herein may be determined by the specific application intended. For example, in a filtration process that demands high clarity but tolerates slower flow rate, a filter-aid material comprising at least one filterable composite adsorbent of low permeability may be used, whereas in a filtration process that demands high flow rate but does not require high clarity, a filter-aid materials comprising at least one filterable composite adsorbent of high permeability may be used. Similar reasoning applies to the choice of the at least one adsorbent component, and to the at least one filterable composite adsorbent when used in conjunction with other materials, or when preparing mixtures containing the products.

In one embodiment disclosed herein, a silica gel adsorbent for chill-proofing of beer is precipitated in-situ upon expanded perlite. The resulting composite has both the properties of the chili-proofing obtained from the silica gel adsorbent, as well as the filtration properties of the expanded perlite filtration component. In another embodiment, the resulting silica gel/expanded perlite filterable composite adsorbent may further be mixed with at least one additional filtration component. In one embodiment, the at least one additional filtration component may also comprise expanded perlite. In another embodiment, the at least one additional filtration component may comprise a filtration component that is different than expanded perlite.

In another embodiment, silica gel may be precipitated in-situ onto diatomite, a biogenic silica. The resulting composite has both the properties of the chill-proofing obtained from the silica gel adsorbent, as well as the filtration properties of the diatomite filtration component. In another embodiment, the resulting silica gel/diatomite filterable composite adsorbent may further be mixed with an at least one additional filtration component. In one embodiment, the at least one additional filtration component may also comprise diatomite. In another embodiment, the at least one additional filtration component may comprise a filtration component that is different than diatomite.

In one embodiment, the filter-aid material comprising at least one filterable composite adsorbent may be pulverized. In another embodiment, the filter-aid material may comprise at least one filterable composite adsorbent that has been pulverized. Pulverization may lead to an increase in surface area of the filter-aid material and/or filterable composite adsorbent and, thus, an increased ability to adsorb particles and/or constituents in the fluid to be filtered. In addition, pulverization may lead to a greater number of unlocked silica gel sites of the filter-aid material and/or filterable composite adsorbent and, thus, an increased ability to adsorb particles and/or constituents in the fluid to be filtered. However, too much pulverization can result in a decrease in permeability. Thus, in one embodiment, the pulverization is controlled to achieve the desired balance between adsorbency and permeability.

B. Methods for Preparing a Filterable Composite Adsorbent

Sodium silicate is used herein to refer to any one of several compounds comprising sodium oxide ($Na_2O$) and silica ($SiO_2$). Such combinations may include, for example, sodium ortho silicate ($Na_4SiO_4$), sodium meta silicate ($Na_2SiO_3$), and sodium disilicate ($Na_2Si_2O_5$). In one embodiment, the sodium silicate is a diatomite-based based sodium silicate. In another embodiment, sodium silicate is substituted in whole or in part for at least one ammonium silicate and/or at least one alkali metal silicate, such as lithium, sodium, potassium, rubidium, and cesium silicates, in certain embodiments, sodium silicate having an $SiO_2/Na_2O$ ratio of about 3.2 and a concentration of about 2% is added to water to a concentration of about 2% by weight. Sodium silicate with a $SiO_2/Na_2O$ ratio of 3.2 and a concentration of 20% may be purchased, for example, from World Minerals Inc.

An acid or salt thereof may be added to the slurry in an amount sufficient to increase the acidity (i.e., reduce the pH) of the slurry to a pH range suitable for the precipitation of silica gel. Any suitable acid may be selected, such selection being within the skill of one in the art. In one embodiment, the acid may be sulfuric acid. In another embodiment, the acid may be phosphoric acid. In still another embodiment, the acid may by hydrochloric acid. In yet another embodiment, the acid may be nitric acid, in still yet another embodiment, the acid may be acetic acid. A filtration component, chosen from among any suitable filtration component previously known or hereinafter discovered, may then be added to the solution. In one embodiment, the filtration component is the commercially-available filtration component Celite Standard Super-Cel®, manufactured by World Minerals Inc. In another embodiment, the filtration component is the commercially-available filtration component Celite Hyflo Super-Cel®, manufactured by World Minerals Inc. In a further embodiment, the filtration component is the commercially-available filtration component Celite 512®, manufactured by World Minerals Inc. In a further embodiment, the filtration component is the commercially-available filtration component Celite 512Z®, manufactured by World Minerals Inc. In still another embodiment, the filtration component is the commercially-available filtration component Celite 289®, manufactured by World Minerals Inc. In still a further embodiment, the filtration component is the commercially-available filtration component Filter-Cel®, manufactured by World Minerals Inc.

After the filtration component has been added, the slurry is stirred periodically until gelling occurs. This may take about 25 to about 60 minutes depending upon the acidity of the solution and the sodium silicate concentration of the slurry. Next, water is added, for example from about 20 mL to about 500 mL of water, to disperse the gelled slurry. The slurry is then filtered and the resulting cake is washed with water. Then the cake is dried until the excess fluid in the cake has evaporated. For example, the cake may be dried at a temperature ranging from about 110° C. to about 200° C.

The amount of the filtration component added may be based upon the amount of silica gel desired to be in the resultant filterable composite adsorbent and/or final filter-aid material. While increasing the percentage of silica gel generally acts to increase the filter-aid material's ability to act as an adsorbent, it generally acts to decrease its ability to act as a filter material. Conversely, decreasing the percentage of silica gel generally acts to decrease the filter-aid material's ability to act as an adsorbent while increasing its ability to act as a filter material.

Accordingly, the amount of the adsorbent component in the filterable composite adsorbent may comprise from between greater than about 0 to about 100% by weight of the total filterable composite adsorbent. In one embodiment, the adsorbent component may comprise greater than about 5% by weight of the total filterable composite adsorbent. In another embodiment, the adsorbent component may comprise greater than about 15% by weight of the total filterable composite adsorbent. In another embodiment, the adsorbent component may comprise greater than about 25% by weight of the total filterable composite adsorbent. In another embodiment, the adsorbent component may comprise greater than about 40% by weight of the total filterable composite adsorbent. In another embodiment, the adsorbent component may comprise greater than about 50% by weight of the total filterable composite adsorbent. In another embodiment, the adsorbent component may comprise greater than about 70% by weight of the total filterable composite adsorbent. In another embodiment, the adsorbent component may comprise greater than about 80% by weight of the total filterable composite adsorbent.

The amount of the filtration component in the filterable composite adsorbent may comprise from between greater than about 0 to about 100% by weight of the total filterable composite adsorbent. In one embodiment, the filtration component may comprise greater than about 5% by weight of the total filterable composite adsorbent. In another embodiment, the filtration component may comprise greater than about 15% by weight of the total filterable composite adsorbent. In another embodiment, the filtration component may comprise greater than about 25% by weight of the total filterable composite adsorbent. In another embodiment, the filtration component may comprise greater than about 40% by weight of the total filterable composite adsorbent. In another embodiment, the filtration component may comprise greater than about 50% by weight of the total filterable composite adsorbent. In another embodiment, the filtration component may comprise greater than about 70% by weight of the total filterable composite adsorbent. In another embodiment, the filtration component may comprise greater than about 80% by weight of the total filterable composite adsorbent.

In one embodiment, the adsorbent component may comprise from about 5% to about 15% by weight of the total filterable composite adsorbent and the filtration component may comprise from about 85% to about 95% by weight of the total filterable composite adsorbent. In another embodiment, the adsorbent component may comprise from about 65% to about 75% by weight of the total filterable composite adsorbent and the filtration component may comprise from 25% to 35% by weight of the total filterable composite adsorbent. In a further embodiment, the filterable composite adsorbent comprises a greater amount by weight of the adsorbent component than the filtration component.

After formation of the filterable composite adsorbent, the filterable composite adsorbent may then be mixed with at least one additional filtration component. The at least one additional filtration component may be chosen from any suitable filtration component previously known or hereinafter discovered and may be either the same or different from the at least one filtration component in the filterable composite adsorbent. In one embodiment, the additional filtration component is the commercially-available filtration component Celite Standard Super-Cel®, manufactured by World Minerals Inc. In another embodiment, the additional filtration component is the commercially-available filtration component Celite Hyflo Super-Cel®, manufactured by World Minerals Inc. In a further embodiment, the additional filtration component is the commercially-available filtration component Celite 512®, manufactured by World Minerals Inc. In a further embodiment, the filtration component is the commercially-available filtration component Celite 512Z®, manufactured by World Minerals Inc. In yet another embodiment, the additional filtration component is the commercially-available filtration component Celite 289®, manufactured by World Minerals Inc. In yet a further embodiment, the additional filtration component is the commercially-available filtration component Filter-Cel®, manufactured by World Minerals Inc.

In cases in which the filter-aid material comprising at least one filterable composite adsorbent further comprises at least one additional filtration component, the additional filtration component may comprise from greater than about 0% to about 100% of the total weight of the filter-aid material. In one embodiment, the additional filtration component may comprise greater than about 5% by weight of the total filter-aid material. In another embodiment, the additional filtration component may comprise greater than about 30% by weight of the total filter-aid material. In a further embodiment, the additional filtration component may comprise greater than about 50% by weight of the total filter-aid material. In yet another embodiment, the additional filtration component may comprise greater than about 65% by weight of the total filter-aid material. In yet a further embodiment, the additional filtration component may comprise greater than about 80% by weight of the total filter-aid material.

In cases in which the filter-aid material comprising at least one filterable composite adsorbent further comprises at least one additional filtration component, the filterable composite adsorbent may comprise from greater than about 0% to about 100% of the total weight of the filter-aid material. In one embodiment, the filterable composite adsorbent may comprise greater than about 5% by weight of the total filter-aid material. In another embodiment, the filterable composite adsorbent may comprise greater than about 30% by weight of the total filter-aid material. In a further embodiment, the filterable composite adsorbent may comprise greater than about 50% by weight of the total filter-aid material. In yet another embodiment, the filterable composite adsorbent may comprise greater than about 65% by weight of the total aid material. In yet a further embodiment, the filterable composite adsorbent may comprise greater than about 30% by weight of the total filter-aid material.

In one embodiment, the at least one additional filtration component may comprise from about 60% to about 70% by weight of the total filter-aid material and the filterable composite adsorbent may comprise from about 30% to about 40% by weight of the total filler-aid material.

Specific properties of filter-aid materials comprising at least one filterable composite adsorbent can be modified by further physical or chemical reaction of the material after the initial filter-aid material comprising at least one filterable composite adsorbent has been made, for example to enhance at least one property (for example, solubility and surface characteristics) and/or to yield a new product with a specialized use. Examples of such further modifications include, for example, hydration, acid washing, surface treatment, and organic derivatization, as disclosed, for example, in U.S. Pat. No. 6,712,974 to Palm et al.

C. Methods of Using a Filterable Composite Adsorbent

The filter-aid material comprising at least one filterable composite adsorbent described herein may be used in many of the same applications as currently available adsorbents, but offers added properties, such as, for example, increased permeability, low centrifuged wet density, and uniquely shaped particles (e.g., fibers), as well as improved efficiency and/or economy.

The filter-aid material comprising at least one filterable composite adsorbent disclosed herein, and its optional further modifications, may be used in filtration applications in a manner analogous to that of porous filtration media. Filter-aid materials comprising at least one filterable composite adsorbent may be applied to a septum to improve clarity and increase flow rate in filtration processes or added directly to the fluid. Depending on the particular separation involved, filter-aid materials comprising at least one filterable composite adsorbent may be used in pre-coating, body feeding, or both.

In one embodiment, the method of adsorption and filtration comprises (i) providing a filter-aid material comprising at least one filterable composite adsorbent, (ii) pre-coating a filter element with the filterable composite adsorbent, and (iii) suspending the filter-aid material comprising at least one filterable composite adsorbent in a fluid containing particles and/or constituents to be removed from the fluid, wherein the filterable composite adsorbent may be supported on a filter element.

In another embodiment, the method of adsorption and filtration comprises (i) providing a filterable composite adsorbent, (ii) further mixing the filterable composite adsorbent with an at least second filtration component to form a filter-aid material (iii) pre-coating a filter element with the filter-aid material, and (iv) suspending the filter-aid material in a fluid containing particles and/or constituents to be removed from the fluid, wherein the filter-aid material may be supported on a filter element.

To maximize the adsorption of particles and/or constituents, such as proteins, contributing to chili haze, one embodiment disclosed herein comprises a combination of pre-coating and body feeding.

In an another embodiment, the method of adsorption and filtration comprises the step of passing a fluid containing undesired particles or constituents to be adsorbed through a filter-aid material comprising at least one filterable composite adsorbent, in the form of a rigid shape supported on a septum.

The filter-aid material comprising at least one filterable composite adsorbent disclosed herein can be shaped, molded, extruded, sintered, or otherwise formed into permeable sheets, plates, disks, polyhedrons, or other formed shapes that have adsorbent properties. Fluids can then be passed through the filter-aid material comprising at least one filterable composite adsorbent to achieve both filtration and adsorption.

The filter-aid material comprising at least one filterable composite adsorbent disclosed herein may be used in conjunction with other media (e.g., different porous filtration component materials) to form a filter-aid material for use in filtration applications and/or to further modify or optimize a filtration process. For example, mixtures of the filterable composite adsorbent with, for example, diatomite, expanded perlite, pumicite, natural glass, cellulose, activated charcoal, clay, or other materials, may be useful additional filtration components. Sometimes, these blends are more elaborate and enable the blend to be formed into sheets, pads, cartridges, or monolithic or aggregate media capable of being used as supports or substrates.

The filter-aid materials comprising at least one filterable composite adsorbent disclosed herein can also be useful in applications other than filtration, since adsorbents or filtration media can be useful in applications that do not necessarily depend explicitly on either conventional adsorption or filtration. For example, substances such as silica gel, fumed silica, neutral clay, alkaline clay, zeolites, catalysts, polymers, and alkaline earth silicate hydrates can be used as fillers, and biogenic silica, natural glass, expanded perlite, pumice, expanded pumice, pumicite, expanded obsidian, expanded volcanic ash, buoyant glass, buoyant polymer, and cellulose can also be used as fillers.

Many other modifications and variations of the invention as hereinbefore set forth can be made without departing from the spirit and scope thereof. Other than in the examples, or where otherwise indicated, all numbers expressing quantities of ingredients, reaction conditions, and so forth used in the specification and claims are understood as being modified in all instances by the term "about." Accordingly, unless indicated to the contrary, the numerical parameters set forth in the following specification and attached claims are approximations that may vary depending upon the desired properties sought to be obtained herein. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope are approximations, the numerical values set forth in the specific examples are reported as precisely as possible. Any numerical value, however, inherently contain certain errors necessarily resulting from the standard deviation found in their respective testing measurements.

The headers used in this specification are presented for the convenience of the reader and not intended to be limiting of the inventions described herein. By way of non-limiting illustration, concrete examples of certain embodiments of the present disclosure are given below.

EXAMPLES

Several filter-aid materials comprising at least one filterable composite adsorbent as disclosed herein, as well as methods for preparing them, are described in the following examples, which are offered by way of illustration and not by way of limitation.

Example 1

The following procedure was used to prepare several filterable composite adsorbents for evaluation. In each case, a sodium silicate solution with a $SiO_2:Na_2O$ weight ratio of 3.2 to 1 was selected based on a combination of efficiency and price, but other ratios of $SiO_2:Na_2O$ may also be used. The sodium silicate was added to reverse osmosis water with a concentration of about 2%. A quantity of sulfuric acid ($H_2SO_4$) was then added to the slurry to reduce the pH to about 5.5 to 9. A filtration component was then added to the solution. In this example, the filtration component was Harborlite® 200, an expanded milled perlite with a permeability of 0.29 Da and a wet density of about 14.0 lbs/ft$^3$. The amount of filtration component added was based upon the desired amount of silica gel in the end chill-proofing filter-aid product. The slurry was stirred until gelling occurred (about 25-60 minutes depending upon the pH level). Next, water was added to disperse the gelled slurry. The slurry was then filtered and the composite was washed with water. Then, the filterable composite adsorbent was heated in an oven, to evaporate any excess moisture, until a stable weight was obtained.

Table 1 provides information regarding the performance of a chill-proofing filter-aid manufactured by the process described above. Harborlite® 200 was used as the filtration component and different amounts of silica gel were attached thereto by precipitating diatomite based sodium silicate onto the filtration component by varying the pH of the slurry. The control was a simple mixture comprising 90% of Harborlite® 200 and 10% of Millennium Chemical XP103® silica gel. The particle size of the adsorbent components were smaller than the adsorbent particle size of the control sample. As can be seen from Table 1, the turbidity of the filtered fluid was lower after the fluid had been processed through the filterable composite adsorbent compared to processing with either the simple mixture of the control or a process that incorporates no chill-proofing.

TABLE 1

Perlite-based filterable composite adsorbent using DE-based sodium silicate

| | Silica gel % | Reaction pH | WD lb/ft$^3$ | Perm. Darcies | BET S.A. m$^2$/g | NTU |
|---|---|---|---|---|---|---|
| Harbolite ® 200 | 10 | 7.7 | 14.9 | 0.54 | 41.2 | 4.2 |
| Harbolite ® 200 | 17 | 7.8 | 16.0 | 0.35 | 68.3 | 4.3 |
| Harbolite ® 200 | 0 | — | 14.9 | 0.29 | — | — |
| Control | 10 | — | — | — | — | 7.2 |
| Blank | — | — | — | — | — | 34.3 |

Example 2

The procedure of Example 1 was repeated, except that Celite Standard Super-Cel® and Celite Hyflo Super-Cel® were used as filtration components in the place of the Harborlite® 200, Celite Standard Super-Cel® filtration component is a diatomite-based filtration component with a permeability of 0.25 Da and a wet density of about 9 lbs/ft$^3$. Celite Hyflo Super-Cel® filtration component is also diatomite based, but has a permeability of 1.10 Da and a wet density of 10 lbs/ft$^3$.

Table 2 shows the filtration properties of a diatomite-based chill-proofing filter-aid using different amounts of silica gel and at different pH levels. The base materials were Celite Hydro Super-Cel® and Celite Standard Super-Cel® diatomite. It is shown that the relative amount of silica gel precipitated upon the filtration component had a direct relationship with the BET surface area of the adsorbent component.

Table 3 shows the performance of a diatomite based chill-proofing aid of Table 2. The filterable composite adsorbent was more effective than either the simple mixture of the control or a process that involves no chill proofing as evidenced by the low turbidity values of the filtered fluid.

Table 4 snows the performance of diatomite based chill-proofing filter-aid using Celite Standard Super-Cel® from Table 2 with different amounts of silica gel attached thereto by precipitating diatomite based sodium silicate onto the filtration component by varying the pH of the slurry. The control was a system simple mixture of 90% of Celite Standard Super-Cel® and 10% of Millennium Chemicals XP103® silica gel. Again, the filterable composite adsorbent as disclosed herein provided a superior value than either the control system or the system which implemented no chill-proofing measures.

TABLE 2

Filtration properties of DE-based filterable composite adsorbent using DE-based sodium silicate

| Silica gel % | Rxn. pH | WD lb/ft$^3$ | Perm Darcies | BET S.A. m$^2$/g |
|---|---|---|---|---|
| Celite Hyflo Super-Cel ® | | | | |
| 10 | 7.78 | 19.2 | 1.66 | 72.8 |
| 10 | 7.45 | 20.1 | 1.39 | 78.5 |
| 7.5 | 6.75 | 19.5 | 1.63 | 63.5 |
| 5 | 7.20 | 19.5 | 1.56 | 40.1 |
| | | 21.5 | 0.71 | 1.7 |
| 10 | 7.42 | 18.1 | 0.52 | 83.0 |
| Celite Standard Super-Cel ® | | | | |
| 7.5 | 7.20 | 18.1 | 0.55 | 58.0 |
| 7.5 | 7.25 | 18.1 | 0.51 | 59.0 |
| 5 | 7.22 | 18.8 | 0.28 | 39.6 |
| | | 21.5 | 0.21 | 3.4 |

TABLE 3

Chill-haze removal by filterable composite adsorbent ("FCA") formed by Celite Hyflo Super-Cel ® and DE-based sodium silicate

| | Control* | Silica Gel 10% | 10% | 10% | Blank |
|---|---|---|---|---|---|
| FCA (g/100 mL) | 0.6 | 0.6 | 0.6 | 0.6 | 0 |
| NTU Average | 35.5 | 26.25 | 27.65 | 30.1 | 56.1 |
| pH | | 6.38 | 6.66 | 7.10 | — |

TABLE 4

Chill-haze removal by filterable composite adsorbent ("FCA") formed by Celite Standard Super-Cel ® and DE-based sodium silicate

| | Control* | Silica Gel 10% | 7.5% | Blank |
|---|---|---|---|---|
| FCA (g/100 mL) | 0.6 | 0.6 | 0.6 | 0 |
| NTU Average | 34.6 | 32.8 | 21.1 | 74.5 |
| pH | | 7.42 | 7.20 | — |

Example 3

The procedure of Example 2 was repeated with the exception of replacing the sodium silicate solution used in Example 2 with a commercial sodium silicate solution.

Again, different filtration components were used in the process to create the filterable composite adsorbent (Celite Standard Super-Cel®, Celite Hyflo Super-Cel®, and Celite 512®).

Tables 5-8 show the performance of a commercial non-diatomite based sodium silicate. In Tables 5-7, the commercial sodium silicate solution used was PQ N-Clear®, manufactured by PQ Corporation of Valley Forge, Pa. PQ N-Clear® has a $SiO_2:Na_2$ ratio of 3.22:1 and a pH of 11.3. In Table 8, the commercial sodium silicate solution used was PQ N®, manufactured by PQ Corporation of Valley Forge, Pa. Table 5 reflects a chill-proofing filtration component formed by Celite Hyflo Super-Cel®. Table 6 reflects Celite Standard Super-Cel® as the filtration component. Table 7 reflects Celite 512® as the filtration component, Celite 512® has a permeability of 0.50 Da and a wet density of about 9 lbs/ft³. For each case, the control comprised a simple mixture 90% Celite Standard Super-Cel® and 10% Millennium Chemical XF103® silica gel.

TABLE 5

Chill-haze removal by filterable composite adsorbent ("FCA") formed by Celite Hyflo Super-Cel® and PQ's N-Clear® sodium silicate

| FCA | | Silica Gel | | | | | | | |
|---|---|---|---|---|---|---|---|---|---|
| (g/100 mL) | Control 0.6 | 7.5% 0.6 | 7.5% 0.6 | 7.5% 0.6 | 7.5% 0.6 | 7.5% 0.6 | 10% 0.6 | 10% 0.6 | Blank 0 |
| NTU Average | 39.8 | 31.2 | 42.7 | 28.6 | 28.4 | 42.5 | 27.6 | 29.8 | 89.3 |
| pH | | 5.62 | 7.52 | 7.56 | 7.23 | 6.41 | 7.69 | 6.91 | |

TABLE 6

Chill-haze removal by filterable composite adsorbent ("FCA") formed by Celite Standard Super-Cel® and PQ's N-Clear® sodium silicate

| FCA | | Silica Gel | | | | |
|---|---|---|---|---|---|---|
| (g/100 mL) | Control 0.6 | 7.5% 0.6 | 7.5% 0.6 | 10% 0.6 | 10% 0.6 | Blank 0 |
| NTU Average | 20.5 | 18.8 | 23.6 | 15.2 | 19.5 | 63.0 |
| pH | | 6.61 | 7.64 | 6.72 | 7.21 | |

TABLE 7

Chill-haze removal by filterable composite adsorbent ("FCA") formed by Celite 512® and PQ's N-Clear® sodium silicate

| FCA | | Silica Gel | | | | | | |
|---|---|---|---|---|---|---|---|---|
| (g/100 mL) | Control 0.6 | 7.5% 0.6 | 7.5% 0.6 | 8.8% 0.6 | 10% 0.6 | 10% 0.6 | 10% 0.6 | Blank 0 |
| NTU Average | 20.5 | 24.1 | 24.1 | 22.9 | 16.6 | 24.1 | 23.4 | 63.0 |
| pH | | 7.56 | 6.23 | 7.56 | 7.68 | 7.48 | 7.56 | |

TABLE 8

Chill-haze removal by filterable composite adsorbent ("FCA") formed by PQ's N® sodium silicate

| | | Silica Gel | | |
|---|---|---|---|---|
| | Control | Celite Standard Super-Cel® | Celite 512® | Celite Hyflo Super-Cel® |
| Silica gel content | 10% | 7.5% | 7.5% | 7.5% |
| FCA (g/100 mL) | 0.6 | 0.6 | 0.6 | 0.6 |
| NTU Average | 26.2 | 18.0 | 24.7 | 25.6 |
| pH | | 7.45 | 7.5 | 7.45 |

Example 4

A filterable composite adsorbent was made using a Celite Standard Super-Cel® and diatomite based sodium silicate, 43 g of sodium silicate solution (containing 6.75 g of dissolved silica) was added to 450 g of water. Next, 3.16 g of sulfuric acid (98%) was added to the solution to reduce the solution pH to 7.2. The filtration component (Celite Standard Super-Cel®) was then added to the solution. The slurry was stirred for 37 minutes at which time the slurry began to gel. 150 mL of water was added to disperse the gelled slurry. Then the slurry was filtered and the slurry cake was repeatedly washed with 300 mL of water. Finally, the cake was then dried by heating it at 110° C. for three hours.

Example 5

The procedure of Example 1 was repeated to form a number of filterable composite adsorbent compositions except that Filter-Cel® was used as the filtration component in the place of the Harborlite® 200. Different amounts of silica gel were attached thereto by precipitating diatomite based sodium silicate onto the filtration component by varying the pH of the slurry. The resultant filterable composite adsorbents ranged in make-up from 7.5% by weight silica gel to 70% by weight silica gel. In addition, the filterable, composite adsorbents were then treated by pulverization to vary the particle size of the filterable composite adsorbent compositions from a d50 of 19 microns to a d50 of 39 microns.

Next, the filterable composite adsorbents were mixed with a second filtration component, Celite 512Z®, such that the resultant filter aid materials comprised 35% by weight filterable composite adsorbent and 65% by weight of Celite 512Z®.

Table 9 provides information regarding the performance of the filter-aid materials as chili-proofing filter-aids. The filter-aids were used to filter beer at a rate of 0.6 grams per 100 grams of beer. Three trials were run with each filter-aid material with the chill haze, chill haze average, and chill haze standard deviation being recorded, The filter-aids according to this example were compared with the performance of a control comprising a simple mixture of 65% by weight Celite 512Z® and 35% by weight of Brightsorb d-300® (a conventional chillproofing silica gel).

In the foregoing examples and Tables, the term "FCA" is used to represent a filterable composite adsorbent, the term "Brightsorb" is used to represent the adsorbent component Brightsorb d-300®, the term "SG" is used to represent the adsorbent component silica gel, the term "C512Z" is used to represent the filtration component Celite 512Z®, the term "FC" is used to represent the filtration component Filter Cel®, the term "C289" is used to represent the filtration component Celite 289®, and the term "d50" is used to represent median particle size in microns. In addition, the filterable composite adsorbents may be represented by a short sequence comprising (filtration component-adsorbent component (#% by weight adsorbent component)): For example, "C512Z-SG70" represents a filterable composite adsorbent wherein the filtration component is Celite 512Z®, the adsorbent component is silica gel, and the silica gel comprises 70% by weight of the filterable composite adsorbent.

TABLE 9

Filtration properties of filter-aid materials comprising Celite 512Z ® and a filterable composite adsorbent comprising Filter Cel ® as the filtration component

| Filterable Composite Adsorbent ("FCA") | Filter-Aid Material Comprising Mixture of FCA with C512Z | Chill Haze (NTU) 1 | 2 | 3 | Chill Haze Average (NTU) | Chill Haze St. Dev. (NTU) |
|---|---|---|---|---|---|---|
| Control | Brightsorb 35% C512Z 65% | 59.2 | 59.7 | 64 | 61.0 | 2.64 |
| C512Z-SG7.5 (d50 = 22) | C512Z-SG7.5 100%: C512Z 0% | 79.2 | 72.5 | 76.6 | 76.1 | 3.38 |
| FC-SG70 (d50 = 39) | FC-SG70 35%: C512Z 65% | 78.5 | 86.8 | 76.6 | 80.6 | 5.42 |
| FC-SG70 (d50 = 32) | FC-SG70 35%: C512Z 65% | 56.2 | 57.7 | 59.3 | 57.7 | 1.55 |
| FC-SG70 (d50 = 27) | FC-SG70 35%: C512Z 65% | 74.6 | 59.6 | 62.0 | 65.4 | 8.06 |
| FC-SG70 (d50 = 25) | FC-SG70 35%: C512Z 65% | 60 | 62.6 | 69.7 | 64.1 | 5.02 |
| FC-SG45 (d50 = 22) | FC-SG45 35%: C512Z 65% | 74.5 | 78.2 | 82.1 | 78.3 | 3.80 |
| FC-SG7.5 (d50 = 19) | FC-SG7.5 35%: C512Z 65% | 82.1 | 92.7 | 93.3 | 89.4 | 6.30 |

As shown by Table 9, the effectiveness of the filter-aid materials' adsorbency generally increased with an increase in the adsorbent component in the filterable composite adsorbent component. In addition, the effectiveness of the filter-aid materials' adsorbency generally increased with a decrease in particle size due to pulverization. It is believed that pulverization leads to an increased amount of silica gel sites, thus leading to the improved adsorbency.

Example 6

The procedure of example 5 was repeated, except that the filterable composite adsorbent did not undergo pulverization and the proportion of the second filtration component (Celite 512Z®) to the filterable composite adsorbent was varied. The surface area of the Celite 512Z® was measured as 55 m²/gram. The effect of the variance of the ratio of the second filtration component to the filterable composite adsorbent on chili haze and permeability are shown in tables 10 and 11. All trials were aged for 75 hours except for those denoted with (*) which were aged for 99 hours and chilled for 24 hours.

TABLE 10

Filtration properties of filter-aid materials comprising Celite 512Z ® and a filterable composite adsorbent comprising Filter Cel ® as the filtration component

| Trial | FCA % | 2nd Filtration Compoent % | Overall SG % | Chill Haze (NTU) 1 | 2 | 3 | Chill Haze Average | Chill Haze St. Dev. |
|---|---|---|---|---|---|---|---|---|
|  | Brightsorb | Celite 512Z |  |  |  |  |  |  |
| 1 | 0 | 100 | 0 | 262 | 270 |  | 266.0 | 5.7 |
| 2 | 35 | 65 | 35 | 28.5 | 25.6 | 25.2 | 26.4 | 1.8 |
| 3* | 100 | 0 | 100 | 13.5 | 15.7 | 11.7 | 13.6 | 2.0 |
|  | FC-SG70 | Celite 512Z |  |  |  |  |  |  |
| 4* | 100 | 0 | 70 | 10.8 | 7.98 | 8.99 | 9.3 | 1.4 |
| 5 | 50 | 50 | 35 | 31.4 | 26.3 | 32.9 | 30.2 | 3.5 |
| 6 | 35 | 65 | 25 | 37.9 | 33.6 | 30.9 | 34.1 | 3.5 |
| 7 | 25 | 75 | 18 | 52 | 49.4 |  | 50.7 | 1.8 |
| 8 | 10 | 80 | 7.0 | 240 | 240 | 233 | 237.7 | 4.0 |
|  | FC-SG45 | Celite 512Z |  |  |  |  |  |  |
| 9* | 100 | 0 | 45 | 12.4 | 12.0 | 12.2 | 12.2 | 0.2 |
| 10 | 50 | 50 | 23 | 29.2 | 25.4 | 31.1 | 28.6 | 2.9 |
| 11 | 35 | 65 | 16 | 41.7 | 37.4 |  | 39.6 | 3.0 |
| 12 | 25 | 75 | 11 | 45.5 | 41.8 | 49.2 | 45.5 | 3.7 |
| 13 | 10 | 90 | 4.5 | 228 | 244 |  | 236.0 | 11.3 |
|  | FC-SG7.5 | Celite 512Z |  |  |  |  |  |  |
| 14* | 100 | 0 | 7.5 | 13.9 | 13.5 | 13.6 | 13.7 | 0.2 |
| 15 | 50 | 50 | 3.8 | 31.8 | 28.6 |  | 30.2 | 2.3 |
| 16 | 35 | 65 | 2.6 | 47.5 | 41.4 |  | 44.5 | 4.3 |

TABLE 10-continued

Filtration properties of filter-aid materials comprising Celite 512Z ® and a filterable composite adsorbent comprising Filter Cel ® as the filtration component

| Trial | FCA % | 2nd Filtration Compoent % | Overall SG % | 1 | Chill Haze (NTU) 2 | 3 | Chill Haze Average | Chill Haze St. Dev. |
|---|---|---|---|---|---|---|---|---|
| 17 | 25 | 75 | 1.9 | 47.8 | 51.4 | | 49.6 | 2.5 |
| 18 | 10 | 90 | 0.8 | 225 | 237 | 237 | 233.0 | 6.9 |

As can be seen from Tables 10 and 11, the filter-aid materials of the present invention, and in particular that identified by trial 6, were able to exhibit comparable adsorbency when compared with the control (trial 2), however at lower concentrations of silica gel by weight of the total filter aid. Such a reduction in the requirement for the adsorbent component may lead to a considerable cost advantage in production. In addition, the filter-aid material of trial 6 was able to obtain comparable adsorbency while exhibiting a significant increase in permeability as compared to the control.

TABLE 11

Permeability properties of filter-aid materials comprising Celite 512Z ® and a filterable composite adsorbent comprising Filter Cel ® as the filtration component

| Trial | FCA % | 2nd Filtration Component % Celite 512Z | Overall SG % | Surface Area of Filter Aid (m²/g) | Permeability (Darcy) |
|---|---|---|---|---|---|
| | Brightsorb | | | | |
| 1 | 0 | 100 | 0 | | 0.42 |
| 2 | 35 | 65 | 35 | | 0.17 |
| 3* | 100 | 0 | 100 | | |
| | FC-SG70 | | | | |
| 4* | 100 | 0 | 70 | 161 | very slow |
| 5 | 50 | 50 | 35 | | 0.16 |
| 6 | 35 | 65 | 25 | | 0.27 |
| 7 | 25 | 75 | 18 | | |
| 8 | 10 | 90 | 7.0 | | |
| | FC-SG45 | | | | |
| 9* | 100 | 0 | 45 | 173 | very slow |
| 10 | 50 | 50 | 23 | | |
| 11 | 35 | 65 | 16 | | 0.18 |
| 12 | 25 | 75 | 11 | | |
| 13 | 10 | 90 | 4.5 | | |
| | FC-SG7.5 | | | | |
| 14* | 100 | 0 | 7.5 | 94 | very slow |
| 15 | 50 | 50 | 3.8 | | |
| 16 | 35 | 65 | 2.6 | | 0.14 |
| 17 | 25 | 75 | 1.9 | | |
| 18 | 10 | 90 | 0.8 | | |

Example 7

The procedure of Example 6 was repeated, except that the filtration component of the filterable composite adsorbent was changed from Filter Cel® to Celite 289®. The Celite 289® was measured as having a surface area of 35 m²/gram. The effect of the variance of the ratio of the second filtration component to the filterable composite adsorbent on chill haze and permeability are shown in tables 12 and 13. At trials were aged for 75 hours except for those denoted with (*) which were aged for 99 hours and chilled for 24.

TABLE 12

Filtration properties of filter-aid materials comprising Celite 512Z ® and a filterable composite adsorbent comprising Celite 289 ® as the filtration component

| Trial | FCA % | 2nd Filtration Compoent % | Overall SG % | 1 | Chill Haze (NTU) 2 | 3 | Chill Haze Average | Chill Haze St.Dev. |
|---|---|---|---|---|---|---|---|---|
| | Brightsorb | Celite 512Z | | | | | | |
| 19 | 0 | 100 | 0 | 303 | 287 | 294 | 294.7 | 8.0 |
| 20 | 35 | 65 | 35 | 23.0 | 22.6 | 25.9 | 23.8 | 1.8 |
| 21* | 100 | 0 | 100 | 12.5 | 12.8 | 13.8 | 13.0 | 0.7 |
| | C289-SG70 | Celite 512Z | | | | | | |
| 22* | 100 | 0 | 70 | 8.46 | 8.42 | 9.18 | 8.7 | 0.4 |
| 23 | 50 | 50 | 35 | 24.4 | 26.2 | 25.5 | 25.4 | 0.9 |
| 24 | 35 | 65 | 25 | 35.2 | 39.5 | 36.6 | 37.1 | 2.2 |
| 25 | 25 | 75 | 18 | 250 | 254 | 267 | 257.0 | 8.9 |
| 26 | 10 | 90 | 7.0 | 271 | 277 | 281 | 276.3 | 5.0 |
| | C289-SG45 | Celite 512Z | | | | | | |
| 27* | 100 | 0 | 45 | 28.2 | 27.2 | 24.8 | 26.7 | 1.7 |
| 28 | 50 | 50 | 23 | 45.2 | 47 | 38.1 | 43.4 | 4.7 |

TABLE 12-continued

Filtration properties of filter-aid materials comprising Celite 512Z ® and a filterable composite adsorbent comprising Celite 289 ® as the filtration component

| Trial | FCA % | 2nd Filtration Compoent % | Overall SG % | 1 | Chill Haze (NTU) 2 | 3 | Chill Haze Average | Chill Haze St.Dev. |
|---|---|---|---|---|---|---|---|---|
| 29 | 35 | 65 | 16 | 50.8 | 51.9 | 51.8 | 51.5 | 0.6 |
| 30 | 25 | 75 | 11 | 250 | 250 | 258 | 252.7 | 4.6 |
| 31 | 10 | 90 | 4.5 | 271 | 270 | 276 | 272.3 | 3.2 |
|  | C289-SG7.5 | Celite 512Z |  |  |  |  |  |  |
| 32* | 100 | 0 | 7.5 | 23.4 | 21.3 | 22.2 | 22.3 | 1.1 |
| 33 | 50 | 50 | 3.8 | 46.0 | 44.5 | 44.0 | 44.8 | 1.0 |
| 34 | 35 | 65 | 2.6 | 55 | 227 | 248 | 176.7 | 105.9 |
| 35 | 25 | 75 | 1.9 | 220 | 271 | 270 | 253.7 | 29.2 |
| 36 | 10 | 90 | 0.75 | 270 | 281 | 306 | 285.7 | 18.4 |

TABLE 13

Filtration properties of filter-aid materials comprising Celite 512Z ® and a filterable composite adsorbent comprising Celite 289 ® as the filtration component

| Trial | FCA % | 2nd Filtration Component % Celite 512Z | Overall SG % | Surface Area of Filter Aid (m2/g) | Permeability (Darcy) |
|---|---|---|---|---|---|
|  | Brightsorb |  |  |  |  |
| 19 | 0 | 100 | 0 |  | 0.42 |
| 20 | 35 | 65 | 35 |  | 0.17 |
| 21* | 100 | 0 | 100 |  |  |
|  | C289-SG70 |  |  |  |  |
| 22* | 100 | 0 | 70 | 216 | very slow |
| 23 | 50 | 50 | 35 |  |  |
| 24 | 35 | 65 | 25 |  | 0.15 |
| 25 | 25 | 75 | 18 |  |  |
| 26 | 10 | 90 | 7.0 |  |  |
|  | C289-SG45 |  |  |  |  |
| 27* | 100 | 0 | 45 | 135 | very slow |
| 28 | 50 | 50 | 23 |  |  |
| 29 | 35 | 65 | 16 |  | 0.19 |
| 30 | 25 | 75 | 11 |  |  |
| 31 | 10 | 90 | 4.5 |  |  |
|  | C289-SG7.5 |  |  |  |  |
| 32* | 100 | 0 | 7.5 | 80 | very slow |
| 33 | 50 | 50 | 3.8 |  |  |
| 34 | 35 | 65 | 2.6 |  | 0.11 |
| 35 | 25 | 75 | 1.9 |  |  |
| 36 | 10 | 90 | 0.75 |  |  |

Example 8

The procedure of Example 6 was repeated, except that the filterable composite adsorbent was changed from Filter Cel® Celite 512Z®. The Celite 512Z® was measured as having a surface area of 3 m²/gram. The effect of the variance of the ratio of the second filtration component to the filterable composite adsorbent on chill haze is shown in table 14. All trials were aged for 75 hours except for those denoted with (*) which were aged for 99 hours and chilled for 24.

TABLE 14

Filtration properties of filter-aid materials comprising Celite 512Z ® and a filterable composite adsorbent comprising Filter Celite 512Z ® as the filtration component

| Trial | FCA % | 2nd Filtration Compoent % | Overall SG % | Chill Haze 1 (NTU) | 2 | 3 | Chill Haze Average | Chill Haze St.Dev. | Surface Area (m2/g) |
|---|---|---|---|---|---|---|---|---|---|
|  | Brightsorb | Celite 512Z |  |  |  |  |  |  |  |
| 37 | 0 | 100 | 0 | 287 | 280 | 334 | 300 | 29.4 | 3 |
| 38 | 35 | 65 | 35 | 25.0 | 32 | 33 | 30.0 | 4.4 |  |
| 39* | 100 | 0 | 100 | 12.5 | 12.8 | 13.8 | 13.0 | 0.7 |  |
|  | C512Z-SG70 | Celite 512Z |  |  |  |  |  |  |  |
| 40* | 100 | 0 | 70 | 19.8 | 20.9 | 21.4 | 14.8 | 0.8 | 272 |
| 41 | 65 | 35 | 46 | 27.1 | 28.2 | 31.1 | 28.8 | 2.1 |  |
| 42 | 50 | 50 | 35 | 33.1 | 39.4 | 40.9 | 37.8 | 4.1 |  |
| 43 | 35 | 65 | 25 | 240 | 220 | 253 | 238 | 16.6 |  |
| 44 | 10 | 90 |  |  |  |  |  |  |  |

TABLE 14-continued

Filtration properties of filter-aid materials comprising Celite 512Z ® and a filterable composite adsorbent comprising Filter Celite 512Z ® as the filtration component

| Trial | FCA % | 2nd Filtration Compoent % | Overall SG % | Chill Haze (NTU) 1 | 2 | 3 | Chill Haze Average | Chill Haze St.Dev. | Surface Area (m2/g) |
|---|---|---|---|---|---|---|---|---|---|
| | C512Z-SG45 | Celite 512Z | | | | | | | |
| 45* | 100 | 0 | 45 | 15.4 | 14 | 14.9 | 20.7 | 0.7 | 139 |
| 46 | 80 | 20 | 36 | 38 | 38 | | 38.0 | 0.0 | |
| 47 | 50 | 50 | 23 | 263 | 248 | | 256 | 10.6 | |
| 48 | 35 | 65 | 16 | 274 | 285 | | 280 | 7.8 | |
| 49 | 10 | 90 | | | | | | | |
| | C512Z-SG7.5 | Celite 512Z | | | | | | | |
| 50* | 100 | 0 | 7.5 | 28.8 | 30.1 | 27.2 | 28.7 | 1.5 | 48 |

As can be seen from the preceding Tables 10-14, the filter-aid materials according to the instant invention's adsorbency generally increased with an increase in the surface area of the filtration component of the filterable composite adsorbent. It is believed that a high surface area of the filtration component of the filterable composite adsorbent reduces the thickness of the silica gel coating and thereby providing more sites for adsorption of the chill haze particles.

Example 9

The procedure of Example 5 was repeated to form a number of filter-aid materials comprising a filterable composite adsorbent, except that the filterable composite adsorbent did not undergo pulverization and, in half of the materials, Celite 239 was used as the filtration component in the place of Filter-Cel®. The filter-aid materials were then used in a beer filtration process to analyze the wet density and permeability of those mixtures. The results are shown in table 15. Trials 51, 52, 58, and 59 were the controls.

TABLE 15

Wet density and permeability properties of filter-aid materials comprising Celite 512Z ® and a filterable composite adsorbent comprising either Celite 512Z ® Filter Cel ® as the filtration component

| Trial | C512Z | Brightsorb | FCA FC-SG7.5 | FCA FC-SG45 | FCA FC-SG70 | Wet Density (lb/ft3) | Permeability (Darcy) |
|---|---|---|---|---|---|---|---|
| 51 | 100 | 0 | 0 | 0 | 0 | 22.3 | 0.42 |
| 52 | 65 | 35 | 0 | 0 | 0 | 20.8 | 0.17 |
| 53 | 0 | 0 | 100 | 0 | 0 | | Very slow |
| 54 | 65 | 0 | 35 | 0 | 0 | 19.5 | 0.14 |
| 55 | 65 | 0 | 0 | 35 | 0 | 21.2 | 0.18 |
| 56 | 65 | 0 | 0 | 0 | 35 | 23.1 | 0.27 |
| 57 | 50 | 0 | 0 | 0 | 50 | 24.0 | 0.16 |

| | C512Z | Brightsorb | C289-SG7.5 | C289-SG45 | C289-SG70 | | |
|---|---|---|---|---|---|---|---|
| 58 | 100 | 0 | 0 | 0 | 0 | 22.3 | 0.42 |
| 59 | 65 | 35 | 0 | 0 | 0 | 20.8 | 0.17 |
| 60 | 0 | 0 | 100 | 0 | 0 | | Very slow |
| 61 | 65 | 0 | 35 | 0 | 0 | 20.1 | 0.11 |
| 62 | 65 | 0 | 0 | 35 | 0 | 21.2 | 0.19 |
| 63 | 65 | 0 | 0 | 0 | 35 | 23.1 | 0.15 |

As can be seen by Table 15, the filter-aid materials comprising a filterable composite adsorbent of the present invention demonstrate permeabilities which are comparable to, and in many cases better than, the permeability exhibited by one of the controls (Trial 52).

What is claimed is:

1. A method for simultaneously filtering and improving the chill haze stability of a beer, comprising:
   (i) providing a filterable composite adsorbent comprising diatomite as a filtration component and precipitated silica as an adsorption component, wherein the precipitated silica has been precipitated in-situ on the surface of diatomite without thermal sintering or chemical bonding; wherein the precipitated silica has an average particle size of less than about 1 micrometer;
   (ii) pre-coating a filter element with the filterable composite adsorbent; and
   (iii) passing a beer containing particles and/or constituents to be adsorbed through the coated filter element.

2. The method according to claim 1, further comprising suspending a portion of the filterable composite adsorbent in the beer prior to passing the beer through the coated filter element.

3. The method according to claim 1, wherein the particles and/or constituents include chill haze forming proteins.

4. The method according to claim 1, wherein the filter element includes a septum.

5. The method according to claim 1, wherein the average particle size of the precipitated silica is less than about 0.5 microns.

6. The method according to claim 1, wherein the average particle size of the precipitated silica is less than about 0.1 microns.

7. The method according to claim 1, wherein the average particle size of the precipitated silica ranges from about 5 nanometers to about 1 micron.

8. The method according to claim 1, wherein the BET surface area of the precipitated silica ranges from about 25 to about 2550 $m^2/g$.

9. The method according to claim 1, wherein the BET surface area of the precipitated silica ranges from about 50 to about 500 $m^2/g$.

10. The method according to claim 1, wherein the diatomite comprises at least 50% by weight of the filterable composite adsorbent.

11. The method according to claim 9, wherein the precipitated silica comprises at least 15% by weight of the filterable composite adsorbent.

12. The method according to claim 9, wherein the precipitated silica comprises at least 25% by weight of the filterable composite adsorbent.

13. The method of claim 1, wherein the filterable composite adsorbent has an average permeability ranging from about 0.05 Darcy to about 10 Darcy.

14. The method of claim 1, wherein the filterable composite adsorbent has a wet density ranging from about 10 $lb/ft^3$ to about 25 $lb/ft^3$.

15. The method according to claim 1, wherein at least one additional filtration component is mixed with the at least one filterable composite adsorbent.

16. The method according to claim 15, wherein the at least one additional filtration component comprises diatomite.

17. The method according to claim 1, wherein the at least one additional filtration component comprises perlite.

* * * * *